United States Patent

[11] 3,549,805

| [72] | Inventor | John B. Cannon, Jr.<br>State College, Pa. |
|---|---|---|
| [21] | Appl. No. | 678,308 |
| [22] | Filed | Oct. 26, 1967 |
| [45] | Patented | Dec. 22, 1970 |
| [73] | Assignee | HRB-Singer, Inc.<br>State College, Pa.<br>a corporation of Delaware |

[54] OPTICAL SCANNING SYSTEM WITH MULTIPLE CHANNEL OUTPUT
10 Claims, 3 Drawing Figs.

[52] U.S. Cl. ..................................... 178/7.1,
178/7.6; 250/220
[51] Int. Cl. ................................................ H04n 3/08
[50] Field of Search ........................................... 178/6, 7.6,
6IND, 7.1, 7.1E; 250/220

[56] References Cited
UNITED STATES PATENTS

| 1,966,354 | 7/1934 | Noxon ........................ | 178/7.6 |
| 2,953,638 | 9/1960 | Wintringham ............... | 178/7.6 |
| 3,109,057 | 10/1963 | Slavecki et al. .............. | 178/7.6 |

*Primary Examiner*—Robert L. Griffin
*Assistant Examiner*—George G. Stellar
*Attorney*—Brady, O'Boyle & Gates ABSTRACT: The present invention utilizes at least two optical systems having reflective surfaces arranged in a back-to-back configuration in combination with a common scanner such that one optical system utilizes rays from the central portion of the scanner while the second optical system utilizes rays from the peripheral portion of the scanner in aerial reconnaissance operations.

PATENTED DEC 22 1970

3,549,805

INVENTOR
JOHN BERKMAN CANNON JR.

BY Brady, O'Boyle & Gates

ATTORNEYS

OPTICAL SCANNING SYSTEM WITH MULTIPLE CHANNEL OUTPUT

BACKGROUND OF THE INVENTION

Scanning optical systems for use in aerial reconnaissance line scanning systems can be classified into two general types, image scanning systems and object scanning systems. Image scanning systems may take the form of the familiar "Nipkow Disc" which comprises a rotating disc having a plurality of small holes arranged, for example, in a circular or spiral configuration. Also, a drum or disc carrying a helical or spiral slit in close proximity to a stationary straight slit may be employed to perform the scanning function. Several disadvantages of image scanners are inherently present, however. For example, collection of all the energy arriving through the scanning holes or aperture is difficult. Furthermore, the scan angle is limited because the objective lens must be corrected for off axis aberrations over the entire scan. This limitation is particularly serious in reflective optical systems.

Object scanning is denoted by a system wherein the scanning action is accomplished by means external to the optical system proper, that is, the detector sensitive surface or field stop occupies a fixed position in the image plane. This is accomplished by using a mirror or lens which is moved relative to the object scanned either in rotation or a wobbling motion. One type of object scanning apparatus which is well known to those skilled in the art is the coaxial rotating mirror paraxial object scanner. The term "paraxial" is used to denote systems wherein only those rays entering the objective very nearly parallel to its optical axis are used. In such cases, the objective need only be corrected for axial aberrations. For reflective embodiments, a parabolic mirror is preferably utilized because its revolving power is limited only by diffraction. All such systems utilize a fixed combination of refractive or reflective objective elements and detectors wherein the instantaneous field of view is determined either by the size of the sensitive surface of the detector which is located at the focus of the objective or by a field stop located at the focal point behind which is located the detector. In the latter case, additional optical elements may be used to maximize the collection of rays passing through the field stop.

In coaxial systems comprising a scanning device, a parabolic reflective surface, and a folding mirror to direct the collected radiant energy to a detector which may not be coaxial with the scanning mirrors, a "dead spot" exists due to the fact that the folding mirror is placed between the scanning device and the parabolic reflective surface.

SUMMARY OF THE INVENTION

The subject invention pertains to a coaxial scanning optical system which is particularly suited for use in aerial reconnaissance operations and which has for its purpose the utilization of the dead spot in the optical system by employing folding mirrors in a back to back or concentric arrangement in combination with a common target scanner for providing a multiple channel output. A larger useful aperture is obtained thereby and energy may be collected from the target or scene in more than one spectral region simultaneously.

The subject invention comprises a rotating scanning mirror means collecting radiation from the target area parabolic mirror means coaxially located a predetermined distance away from said scanning mirror means for receiving selective light energy reflected therefrom, a first and a second folding mirror means arranged in a back-to-back configuration intermediate the scanning mirror means and the parabolic mirror means, each having a reflective surface whereby a reflective surface of one of said folding mirror means is directed to said scanning mirror means while the reflective surface of the other folding mirror means is directed to said parabolic mirror means, and first and second detector means proximately located, respectively, to said first and second folding mirror means for receiving radiant energy from the reflective surface of said first and second folding mirror means and providing an electrical output signal therefrom.

DESCRIPTION OF THE PREFERRED EMBODIMENTS

Figure 1:
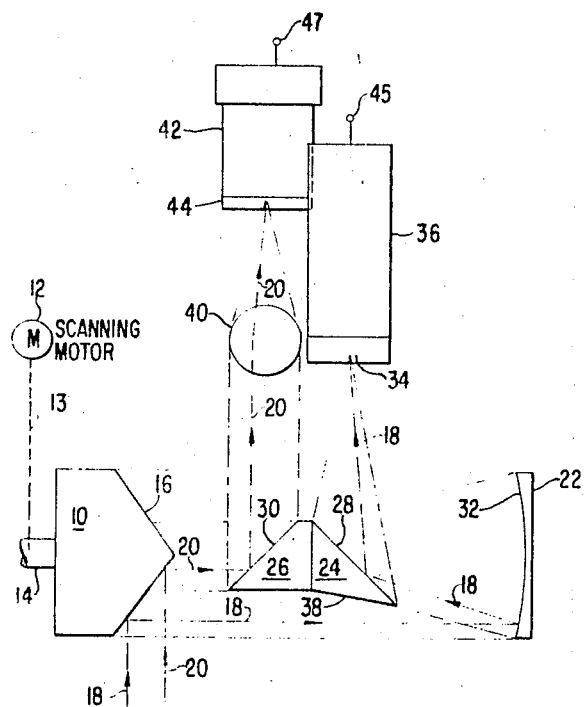
FIG. 1 is a front elevational view of the preferred embodiment of the subject invention.

Attention is now directed to FIG. 1 wherein an object or target scanning mirror means 10 is coupled to a drive motor 12 by means of a mechanical coupling 13 shown in diagrammatic form to a spindle 14 which is located along the central axis of the scanning mirror 10. The scanning mirror 10 is shown situated in a substantially horizontal position and includes two flat reflective surfaces 16, one of which is shown, and are adapted to be sequentially disposed towards a target or scene therebeneath, not shown, to be scanned by means of the rotation provided by the motor 12 as the aircraft carrying the scanning system flys over the target or scene. Light rays 18 and 20 emanating from the target are received and reflected from the reflecting surface 16. Light ray 18 is directed to a second mirror means comprising a parabolic mirror 22 located a predetermined distance in front of and coaxially with the scanning mirror 10. Located intermediate the scanning mirror 10 and parabolic mirror 22 is a third and fourth mirror means comprising folding mirrors 24 and 26 having circular flat reflective faces 28 and 30, respectively. The folding mirrors 24 and 26 are placed in a back-to-back configuration such that the reflective surface 30 is directed towards the centermost portion of the reflecting surfaces 16 of the scanning mirror 10. The flat reflective surface 28 of the folding mirror 24 is positioned toward the parabolic reflecting surface 32 of the parabolic mirror 22.

Light ray 18 which strikes the peripheral portion of the reflective surface 16 is directed to and reflected from the parabolic reflecting surface 32 onto the surface 28 of the folding mirror 24. Light ray 18 is reflected from the surface 28 and impinges at a focal point 34, at which point a photodetector 36 is located. The photodetector 36 is well known to those skilled in the art and produces an electrical signal in accordance with the character of the light ray falling at the focal point 34. The light rays which are reflected from the periphery of scanning mirror surfaces 16 are directed to the parabolic surface 32 insofar as they do not strike the lower surface 38 of the folding mirror 24.

It is a primary object of the present invention that the dead space heretofore caused by the folding mirror 24 is overcome by the now-included fourth mirror means comprising folding mirror 26 such that, for example, light ray 20 impinging towards the center of the reflective surfaces 16 is directed to the circular flat reflective surface 30. Light ray 20 is reflected from the flat mirror surface 30 to a first auxiliary folding mirror 40 which then directs light beam 20 to a second detector 42 having a field stop 44.

The optics utilized with respect to the light ray 18 resulting in translating the light beam to the detector 36 comprises a first channel. When desirable, the detector 36 may be responsive to a predetermined type of light, for example, visible, ultraviolet or infrared. The optics for directing light ray 20 to the second detector 42 comprises a second channel which, when desirable, may also be responsive to a specific type of light energy. The present invention, therefore, is adaptable for collecting energy from the target or scene in more than one spectral region simultaneously.

Figure 2:
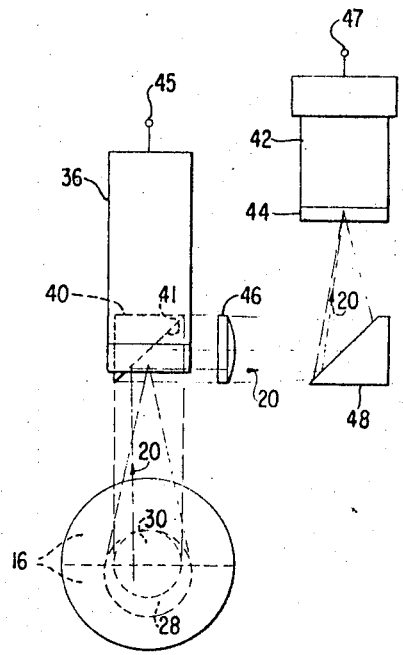
FIG. 2 is a side elevational view of the preferred embodiment.

Reference is now made to FIG. 2 and the optics associated with the second channel including the folding mirror 26, the first auxiliary folding mirror 40, including a flat reflecting surface 41, and the second detector 42. FIG. 2 additionally discloses an objective lens 46 and a second auxiliary folding mirror 48 located between the flat reflecting surface 41 and the field stop 44 associated with the detector 42. Each of the photodetectors 36 and 42 include output terminals 45 and 47, respectively, for providing an electrical output signal in accordance with the light energy translated to the detectors, which outputs are utilized in the usual manner, such as shown in U.S. Pat. No. 3,109,057, issued to R. J. Slavecki, et al. on Oct. 29, 1963 and owned by the same assignee as the present application, to produce a recorded image of the target from each channel.

Figure 3:
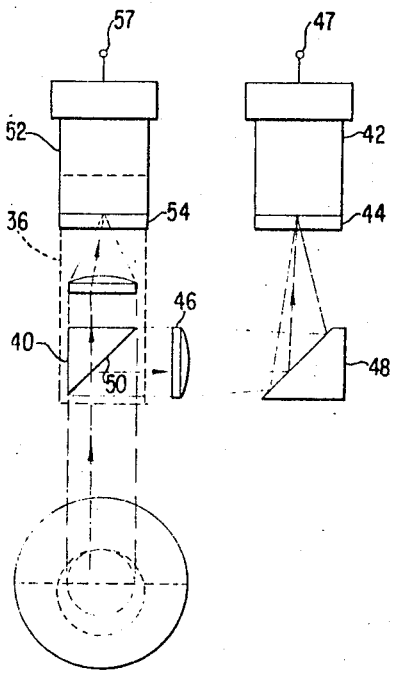
FIG. 3 is a side elevational view of a second embodiment of the present invention.

The second embodiment shown in FIG. 3 is in all respects identical to the first embodiment shown in FIGS. 1 and 2 with the exception that the flat auxiliary folding mirror 40 now includes a partially reflective flat mirror surface 50 such that a portion of the light energy in light ray 20 not only is reflected from the surface thereof but is adapted to pass therethrough. The second embodiment contemplates placing a third detector 52 having an output 57 and a field stop 54 along side of the first detector 36 behind the first auxiliary folding mirror 40. The first detector 36 is shown in phantom perspective for purposes of illustration. By selectively choosing the detector 52 to be responsive to a predetermined type of light, a third channel is provided.

It is thus possible to provide a plurality of channels with a single scanning mirror. Further, by selectively choosing the detectors, several different output signals may be obtained from the same target scanned. For example, both an infrared and visible light recorded image may be obtained simultaneously from the outputs of the respective channels to provide better identification of the target area. In summation, the present invention discloses apparatus comprising two or more concentric optical systems in combination with a common scanner in such a manner that the added optical system uses rays from the central portion of the scanner which were heretofore unusable by the primary reflective optical system because they were obscured by its folding mirror.

I claim:

1. A multichannel scanning optical system comprising in combination:

object scanning mirror means, having at least one reflective surface, directed toward a target to be scanned and operative to reflect light rays received therefrom;

driver means coupled to said scanning mirror means for causing at least one reflective surface to scan said target in a predetermined pattern;

second mirror means located a predetermined distance away from said scanning mirror means to receive light rays reflected from the peripheral portion of said at least one reflective surface;

third mirror means located intermediate said scanning mirror means and said second mirror means and having a reflective surface angularly disposed towards said second mirror means for receiving light rays reflected therefrom when received from the peripheral portion of said scanning mirror means;

first photodetector means located proximately to said third mirror means for receiving light rays reflected therefrom and being responsive thereto to produce a first channel electrical output signal;

fourth mirror means located in alignment with and intermediate said scanning mirror means and said third mirror means and having a reflective surface angularly disposed towards said scanning mirror means and adapted to receive light rays reflected from the central portion of said at least one reflective surface; and second photodetector means located proximately to said fourth mirror means being responsive to light rays reflected therefrom to produce a second channel electrical output signal, said first and said second photodetector means thereby being responsive to the peripheral and centrally directed light rays, respectively, falling on said at least one reflective surface of said scanning mirror means.

2. The invention as defined by claim 1 and wherein said second mirror means comprises a parabolic mirror having a parabolic reflecting surface directed towards said at least one reflecting surface of said scanning mirror means.

3. The apparatus as defined by claim 1 wherein said second mirror means is coaxially located with respect to said scanning mirror means.

4. The apparatus as defined by claim 1 wherein said second mirror means comprises a parabolic mirror coaxially located a predetermined distance away from said scanning mirror means and having a parabolic reflecting surface directed towards said second mirror means.

5. The apparatus as defined by claim 1 wherein said third and said fourth mirror means are located in a mutually back-to-back relationship intermediate said scanning mirror means and said second mirror means.

6. The invention as defined by claim 1 wherein said third and fourth mirror means are comprised of folding mirrors arranged in a back-to-back relationship and each having a substantially flat reflecting surface obliquely directed toward said second mirror means and said scanning mirror means, respectively.

7. The invention as defined by claim 1 and additionally comprising optical means located between said fourth mirror means and said second photodetector means for coupling light rays thereto from said fourth mirror means, said optical means including a first auxiliary folding mirror means angularly disposed with respect to said fourth mirror means, and a second auxiliary folding mirror means having a reflective surface directed towards said first auxiliary mirror means for directing light rays to said second photodetector means.

8. The invention as defined by claim 7 and additionally including an objective lens located between said first and second auxiliary folding mirror means.

9. The invention as defined by claim 7 wherein said first auxiliary folding mirror means includes a partially reflective mirror surface permitting light rays to pass therethrough as well as being reflected therefrom, and additionally including a third photodetector means located behind said partially reflective mirror surface being responsive to light rays passing therethrough to produce a third channel electrical output signal.

10. The invention as defined by claim 7 wherein said first and second auxiliary folding mirror means each have a substantially flat reflecting surface converging towards each other in the direction of said photodetector means.